(12) United States Patent
Rudek et al.

(10) Patent No.: US 11,093,482 B2
(45) Date of Patent: Aug. 17, 2021

(54) MANAGING ACCESS BY THIRD PARTIES TO DATA IN A NETWORK

(71) Applicant: INTERNATIONAL BUSINESS MACHINES CORPORATION, Armonk, NY (US)

(72) Inventors: Krzysztof Rudek, Nowy Wisnicz (PL); Vinod A. Valecha, Pune (IN); Grzegorz Piotr Szczepanik, Cracow (PL); Lukasz Jakub Palus, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 247 days.

(21) Appl. No.: 16/299,747

(22) Filed: Mar. 12, 2019

(65) Prior Publication Data
US 2020/0293514 A1   Sep. 17, 2020

(51) Int. Cl.
*G06F 16/23* (2019.01)
*G06F 16/245* (2019.01)
*G06F 21/62* (2013.01)

(52) U.S. Cl.
CPC ........ *G06F 16/2379* (2019.01); *G06F 16/245* (2019.01); *G06F 21/6218* (2013.01)

(58) Field of Classification Search
CPC ............. G06F 16/2379; G06F 21/6218; G06F 16/245; G06F 21/6245; G06F 21/602;
(Continued)

(56) References Cited

U.S. PATENT DOCUMENTS 9,635,000 B1 * 4/2017 Muftic .................. H04L 9/3239
2004/0193685 A1 * 9/2004 Proehl ................. G06F 21/6263
709/204
(Continued)

FOREIGN PATENT DOCUMENTS

WO   2016063092   4/2016

OTHER PUBLICATIONS

Banerjee et al., "Link Before You Share: Managing Privacy Policies through Blockchain", https://arxiv.org/abs/1710.05363,Cornell University Library, Oct. 15, 2017, 10 pages.
(Continued)

*Primary Examiner* — Jorge A Casanova
(74) *Attorney, Agent, or Firm* — Stephanie Carusillo; Andrew D. Wright; Roberts Calderon Safran & Cole, P.C.

(57) ABSTRACT

Systems and methods for managing access to data in a network are provided. In embodiments, a method includes: receiving, by a computer device, a search request regarding data of a participant, the search request including participant parameters associated with the participant; generating, by the computer device, a record of data associated with the participant based on the search request; sending, by the computer device, a request for data to third party nodes of a blockchain system based on the search request and the record; receiving, by the computer device, results from the blockchain system, the results including at least one set of data from a first node of the third party nodes; and determining, by the computer device, that the set of data requires updating based on the results.

20 Claims, 6 Drawing Sheets

(58) Field of Classification Search
CPC .. G06F 21/645; G06F 16/2365; G06F 16/137; G06F 16/1837; H04L 2209/38; H04L 9/3236
See application file for complete search history.

(56) References Cited

U.S. PATENT DOCUMENTS

| | | | |
|---|---|---|---|
| 2014/0297742 A1* | 10/2014 | Lyren | H04L 67/1089 709/204 |
| 2017/0302450 A1 | 10/2017 | Ebrahimi | |
| 2018/0144153 A1* | 5/2018 | Pead | G06F 21/6245 |
| 2018/0159682 A1* | 6/2018 | Futcher | H04L 9/0637 |
| 2018/0248699 A1* | 8/2018 | Andrade | H04L 9/0897 |
| 2018/0294966 A1* | 10/2018 | Hyun | H04L 9/3226 |
| 2019/0156056 A1* | 5/2019 | Chavez | H04L 9/3247 |
| 2019/0171739 A1* | 6/2019 | Cochrane | G06F 16/2379 |
| 2019/0205563 A1* | 7/2019 | Gonzales, Jr. | H04L 9/3297 |
| 2019/0253431 A1* | 8/2019 | Atanda | H04L 63/105 |
| 2019/0354964 A1* | 11/2019 | Snow | G06F 21/64 |
| 2020/0162448 A1* | 5/2020 | Dasika Venkata Devi | H04L 67/10 |
| 2020/0167336 A1* | 5/2020 | Somani | G06Q 20/223 |
| 2020/0250174 A1* | 8/2020 | Padmanabhan | G06F 16/2365 |

OTHER PUBLICATIONS

Zyskind et al., "Decentralizing Privacy: Using Blockchain to Protect Personal Data", https://ieeexplore.ieee.org/document/7163223/, IEEE, Jul. 20, 2015, 5 pages.

Mell et al., "The NIST Definition of Cloud Computing", NIST, Special Publication 800-145, Sep. 2011, 7 pages.

* cited by examiner

MANAGING ACCESS BY THIRD PARTIES TO DATA IN A NETWORK

BACKGROUND

The present invention relates generally to managing access to a network, more particularly, to managing access by third parties to data in a network.

It is common for a user (e.g., a client) to share certain data (e.g., email address, telephone number, home address, name, etc.) with third parties (e.g., a service provider), such as online service and retail providers. In some instances, users can communicate directly with each third party to authorize or deny the use of their data. In some cases, the user directly authorizes or denies a third party the right to share their data with other third parties. Over time, a user's data may change, resulting in out of date data being stored by third parties and utilized by third parties. Typically, third parties individually request updated data from individual users.

SUMMARY

In a first aspect of the invention, there is a computer-implemented method including: receiving, by a computer device, a search request regarding data of a participant, the search request including participant parameters associated with the participant; generating, by the computer device, a record of data associated with the participant based on the search request; sending, by the computer device, a request for data to third party nodes of a blockchain system based on the search request and the record; receiving, by the computer device, results from the blockchain system, the results including at least one set of data from a first node of the third party nodes; and determining, by the computer device, that the set of data requires updating based on the results.

In another aspect of the invention, there is a computer program product including a computer readable storage medium having program instructions embodied therewith. The program instructions are executable by a computer device to cause the computer device to: receive a search request from a third party regarding data of a participant, the search request including participant parameters associated with the participant; generate a record of data associated with the participant based on the search request; send a request for data to third party nodes of a blockchain system based on the search request and the record; receive results from the blockchain system, the results including sets of data from the third party nodes of the blockchain system; generate and send a request for verification to the participant, wherein the request for verification includes information based on the record and the sets of data; receive a response to the request for verification, the response indicating acceptance or rejection of the information; and initiate updating of the sets of data as needed based on the response to the request for verification.

In another aspect of the invention, there is system including a processor, a computer readable memory, and a computer readable storage medium. The system includes: program instructions to receive a search request regarding data of a participant, the search request including participant parameters associated with the participant and identification of a third party; program instructions to generate a record of data associated with the participant based on the search request; program instructions to send a request for data to the third party based on the search request and the record; program instructions to receive results from the third party, the results including at least one set of data; and program instructions to determine that the set of data requires updating based on the results. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to managing access to a network, more particularly, to managing access by third parties to data in a network. According to aspects of the invention a data management system enables participant users to check a list of third party services that have access to their personal data (e.g., information enabling identification of or communication with the user). In aspects, a user can deny one or more third parties access to their personal data, read what third party services use their personal data for, and ask for removal of one or more pieces of personal data from third party service databases. Thus, embodiments of the invention enable participants in a network to manage the use and distribution of their personal data.

It should be understood that, to the extent implementations of the invention collect, store, or employ personal information provided by, or obtained from, individuals (e.g., email address, name, nickname, home address, date of birth, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a participant accesses a data management system of the invention via a Web User Interface (UI). In aspects, the data management system enables the participant to input the name of one or more third parties (e.g., third party services), and send a request for information to the one or more third parties based on the input, in order to determine personal information of the participant stored by the one or more third parties. In implementations, the data management system enables third parties to send a request to input personal data of participant users (e.g., clients) from their databases into the data management system, along with other information about the use of the personal data. In aspects, the third party requests are communicated to the system via a Representational State Transfer Application Program Interface (REST API). In implementations, the data management system of the present invention uses Master Data Management (MDM) methods to find a record of personal data for a participant by accessing data supplied by multiple third party databases utilizing personal parameters (e.g., first name, last name, data of birth, email address, etc.) of the participant.

Currently, users of third party services receive emails directly from the third parties regarding personal data of the users (e.g., requests for personal data), which is utilized by the third parties. Third parties may utilize old personal data of a user (e.g., old email addresses) when attempting to contact the user. Advantageously, embodiments of the invention enable aggregation of personal data flow, and allow for the generation of a record when the personal data record (e.g., identity) of a user of a given service is not up to date. Implementations of the invention provide improvements to the technical field of personal data management by utilizing a blockchain system of third party databases to share, grant or deny sharing permissions, and update and delete personal data of participants. The term blockchain system as used herein refers to a computer-based system wherein records of transactions regarding personal data of participants are maintained across several computers that are linked in a peer-to-peer network environment. Aspects of the invention utilize unconventional steps of querying nodes of a blockchain system to obtain personal data from multiple third party sources in a network, and generating a record of personal information based on the personal data which can be presented to a participant for verification and for permissions regarding third party access to the personal information of the participant.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
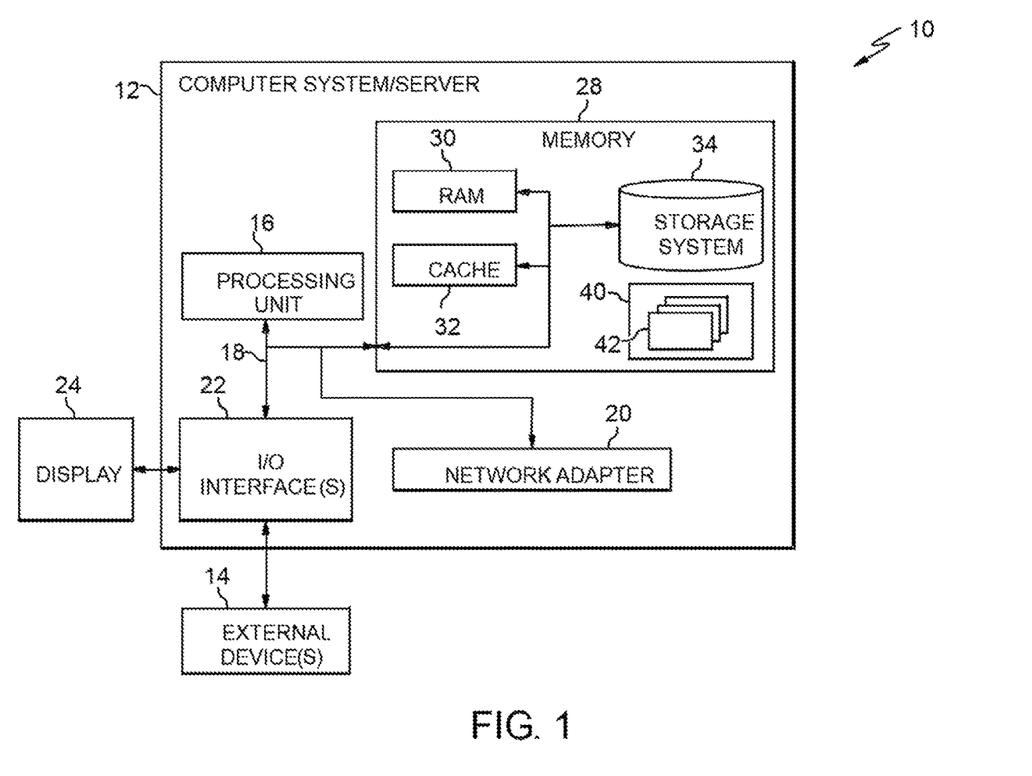
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
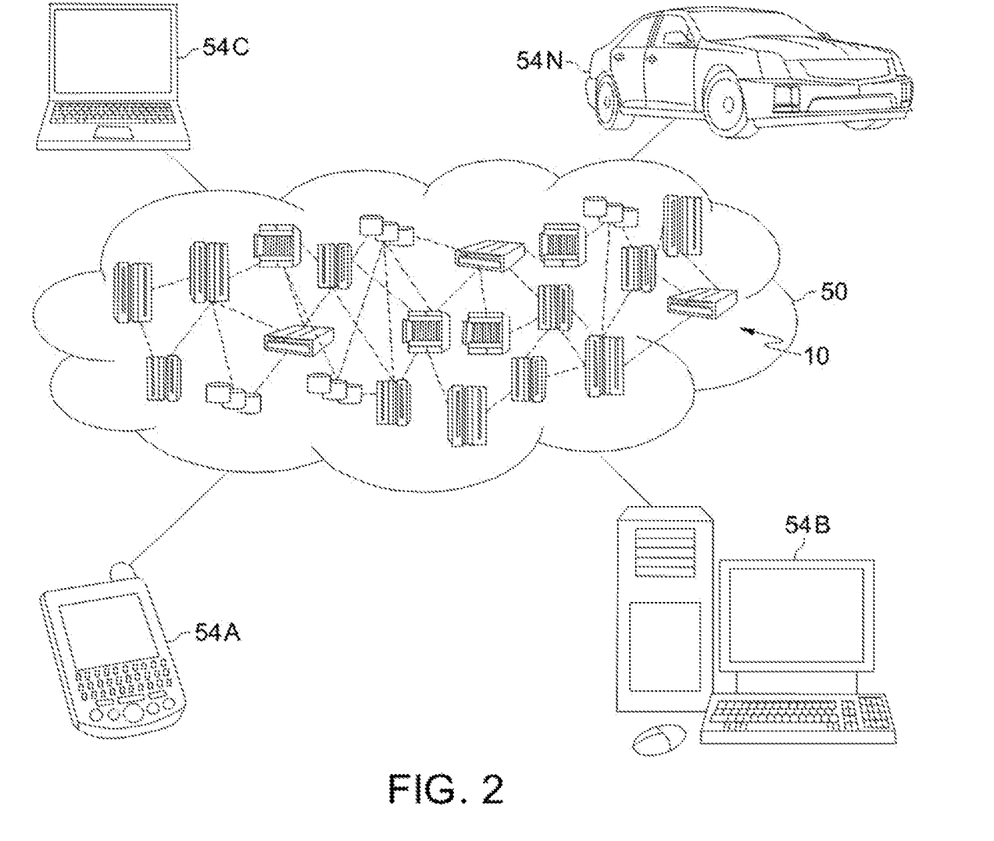
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
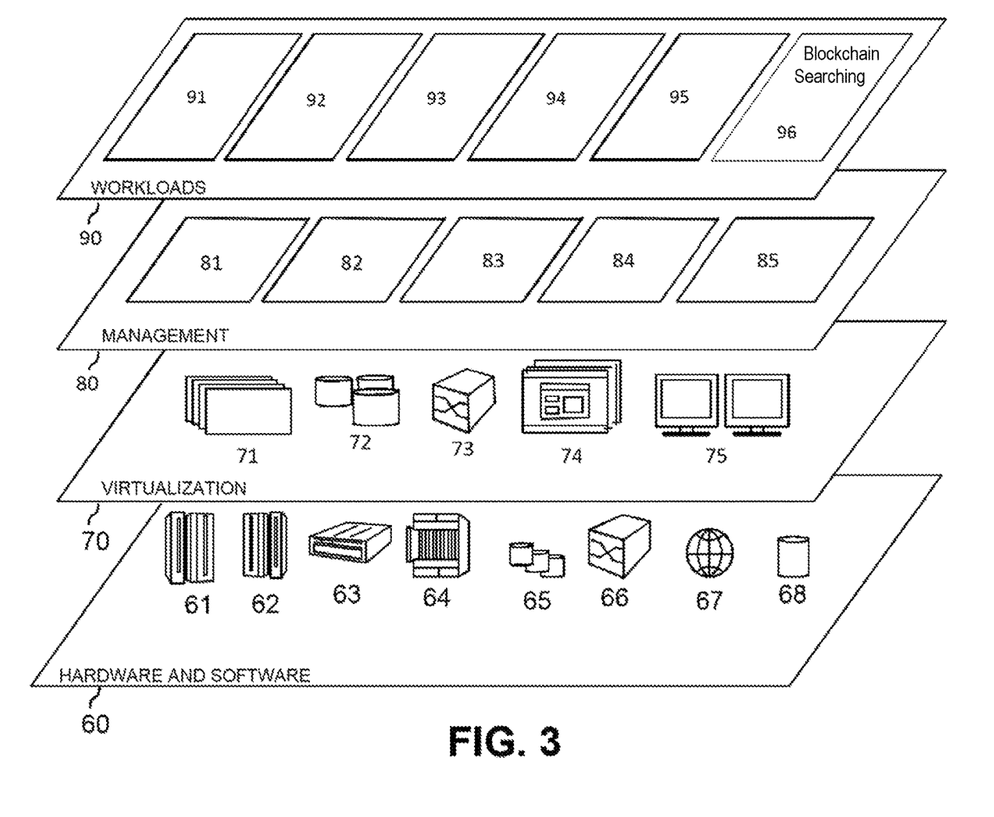
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain searching 96.

Implementations of the invention may include a computer system/server 12 of FIG. 1 in which one or more of the program modules 42 are configured to perform (or cause the computer system/server 12 to perform) one or more functions of the blockchain searching 96 of FIG. 3. For example, the one or more of the program modules 42 may be configured to: receive from a user a search request including search parameters, for the purpose of obtaining a record of personal data of the user; communicates the search to a MDM system and a blockchain system; upon the MDM system returning the record of personal data and potential duplicate records of personal data of the user: send to the blockchain system a request including the search parameters and the record; receive from the blockchain system search results regarding duplicate personal information of the user; and perform an update of the personal data of the user based on the search results where the search results warrant such update.

Figure 4:
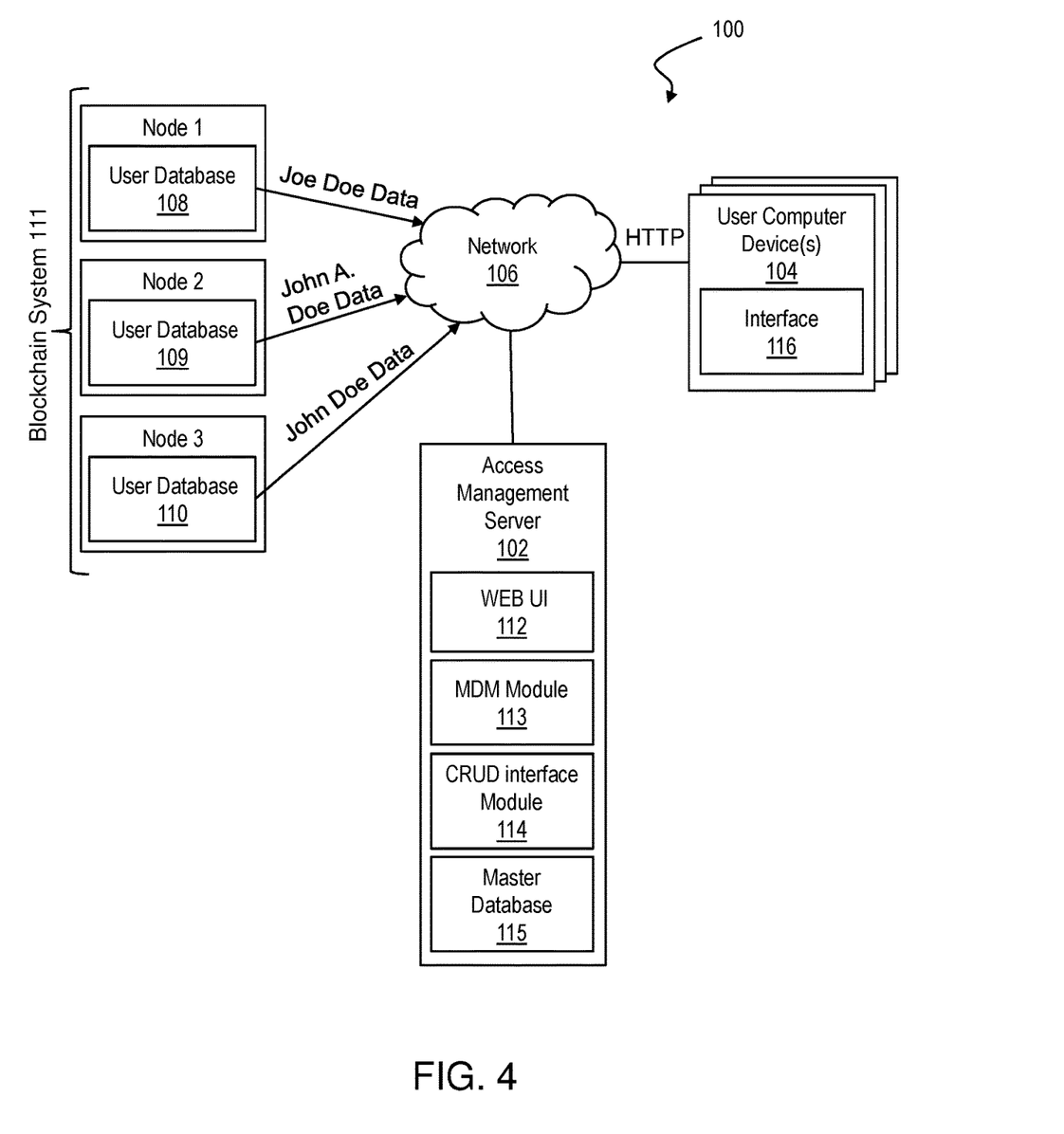
FIG. 4 data management environment in accordance with aspects of the invention.

FIG. 4 depicts an exemplary data management environment 100 in accordance with aspects of the invention. In embodiments, the personal data management environment 100 includes an access management server 102 in communication with a plurality of user computer devices represented at 104 via a network 106 (e.g., using HyperText Transfer Protocol (HTTP)). The personal data management environment 100 also includes a plurality of third party user computer devices represented at Nodes 1-3 in communication with the access management server 102, and optionally, in communication with the user computer device(s) 104 via the network 106. The network 106 may be any suitable communication network or combination of networks, such as a local area network (LAN), a general wide area network (WAN), and/or a public network (e.g., the Internet).

In embodiments, the Nodes 1-3 each include components of the computer system/server 12 of FIG. 1. In implementations, Nodes 1-3 are third party servers having access to respective user databases 108-110 containing personal data (e.g., email address, name, nickname, home address, date of birth, etc.) of participants (e.g., clients of the third parties) in the personal data management environment 100. In aspects, the terms personal data or participant data as used herein refer to information associated with a user enabling the identification of the user (i.e., first name, last name, nickname, etc.) and/or information enabling communication with the user (e.g., mailing address, email address, telephone number, etc.).

In aspects, the Nodes 1-3 each comprise one of the computing nodes 10 of the cloud computing environment 50 depicted in FIG. 2. In embodiments, Nodes 1-3 comprise distributed databases (user databases 108-110) containing information about participants and services of the third parties. In implementations the Nodes 1-3 are nodes of a blockchain system 111. The term blockchain system as used herein refers to a system wherein records of transactions regarding personal data are maintained across several computers that are linked in a peer-to-peer network. Each Node 1-3 may contain information regarding usage of personal data of a given user and the personal data itself. It should be understood that each of Nodes 1-3 may include personal data of a participant of interest that is up-to-date or out of date, complete or incomplete, and may also include personal data that may be the participant of interest's data or may be data of a different participant (e.g., a participant with a similar name). Moreover, each Node 1-3 may house personal data that overlaps with (duplicates) personal data housed at a different one of Nodes 1-3. In the example of FIG. 4, Node 1 houses participant data for "Joe Doe", Node 2 houses participant data for "John A. Doe", and Node 3 houses participant data for "John Doe". In this example, participant data for "John A. Doe" and "John Doe" relates to a first participant, while the participant data for "Joe Doe" relates to a different participant with a similar name. Methods by which the participant data may be managed in accordance with embodiments of the invention are discussed in more detail below.

In embodiments, the access management server 102 is in the form of the computer system/server 12 of FIG. 1. In aspects, the access management server 102 is one of the computing nodes 10 of the cloud computing environment 50 depicted in FIG. 2. The access management server 102 may include one or more program modules (e.g., program module 42 of FIG. 1) executed by the access management server 102 and configured to perform one of more of the functions described below. In implementations, the access management server 102 includes: a Web user interface (UI) 112; a master data management (MDM) module 113; a create, read, update and delete (CRUD) interface module 114; and a master database 115 for storing personal data of participants. In aspects, the MDM module 113 communicates with the user databases 108-110 of Nodes 1-3 for the purposes of identifying a participant based on personal data such as: email address, first name, last name, home address, nickname, physical characteristics of the participant, etc. In implementations, the MDM module 113 is configured to support master data management by removing duplicate data, standardizing data (mass maintaining), and incorporating rules to eliminate incorrect data from entering the access management server 102 in order to create an authoritative source of master data (e.g., accurate and up-to-date personal data of participants).

In aspects, the Web UI 112 is configured to provide an interface by which participants may access information regarding third parties (e.g., represented by Nodes 1-3) and the participant's personal data housed in the databases of the third parties (e.g., user databases 108-110). In embodiments, the Web UI 112 is configured to enable participants to verify their personal data, deny third parties access to their personal data, and request removal of their personal data from third party databases (e.g., user databases 108-110).

With continued reference to FIG. 4, in implementations, the MDM module 113 is configured to obtain search request data from third parties, send a search request to a blockchain system of interconnected nodes (e.g., Nodes 1-3) receive results from the blockchain system 111, and generate a record of potential personal data for a participant based on the request. In embodiments, the MDM module 113 is further configured to send the record to the participant with a request for verification and/or permissions, receive a response from the participant, and take an action based on the participant response. In aspects, actions taken by the MDM module 113 include initiating updating personal data at a third party database (e.g., user database 108) upon determining that the data at the third party database is out of date, initiating removal of the personal data from one or more Nodes 1-3 and/or the access management server 102, and denying third parties (e.g., Nodes 1-3) access to personal data of the participant.

The user computer device(s) 104 may include components of the computer system/server 12 of FIG. 1. In aspects, the user computer device(s) 104 is one of the computing nodes 10 of the cloud computing environment 50 depicted in FIG. 2. The user computer device(s) 104 may be a desktop computer, laptop computer, tablet computer, smartphone, or other personal computing device. In embodiments, the user computer device 104 runs a browser application program that provides an interface 116 by which a user may communicate with the access management server 102, such as through the Web UI 112.

Figure 5:
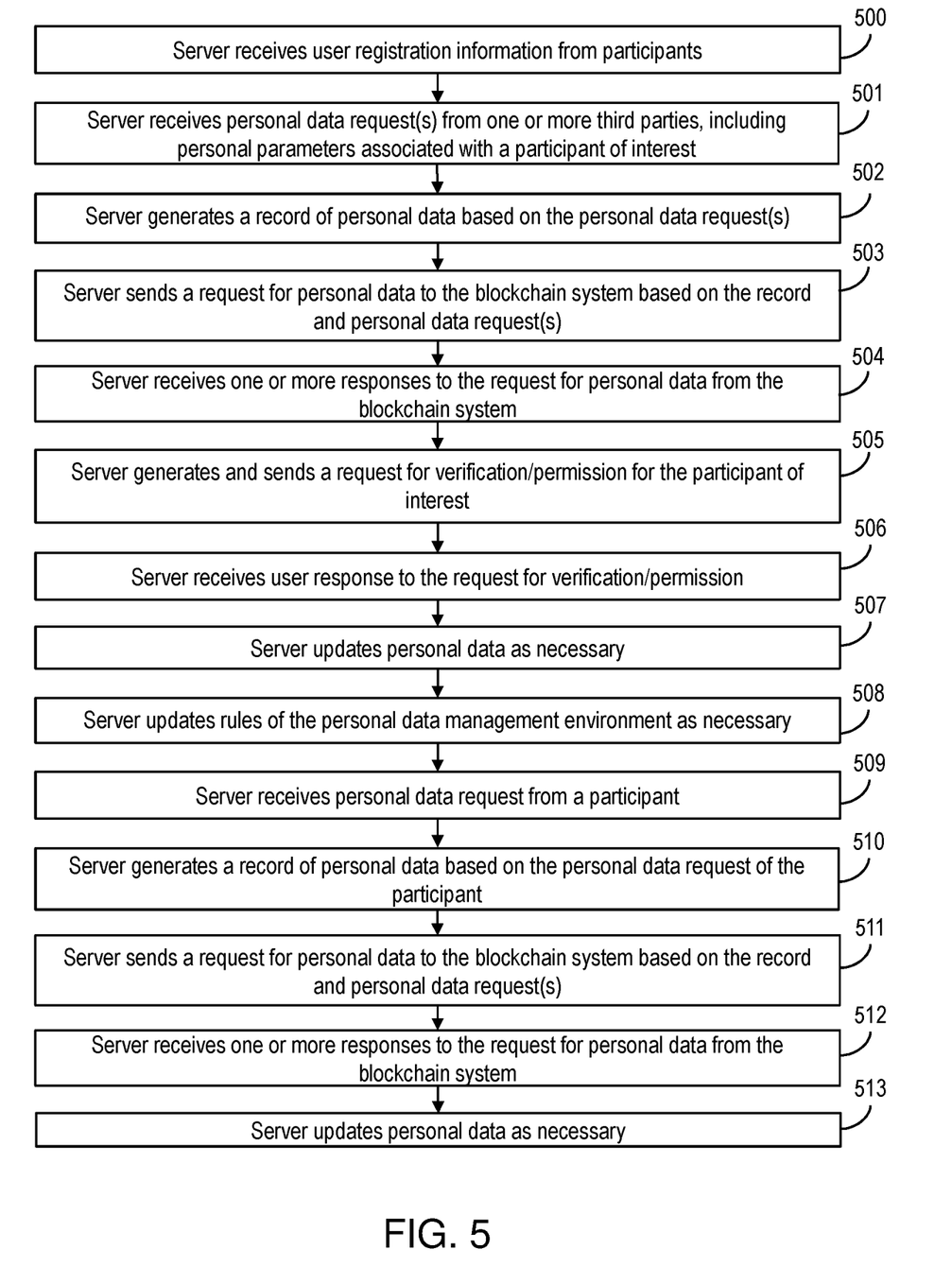
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the access management server 102 receives user registration information from individual user participants (hereafter participants) of the personal data management environment 100. A participant may be, for example, consumers of goods or services provided by third parties (Nodes 1-3 in FIG. 4). In aspects, a participant communicates through the interface 116 of their user computer device 104 with the Web UI 112 of the access management server 102 to set permissions and rules at the access management server 102. Permissions and rules may include, for example, permissions granting or denying one or more third parties access to the participants' personal data.

At step 501, the access management server 102 receives a personal data request from a third party. In aspects, the personal data request includes participant parameters or identifying information regarding a participant of interest, whereby the third party is seeking to obtain verification of personal data of the participant of interest, is seeking to obtain current personal data of the participant of interest, and/or is seeking to obtain permission to utilize personal data of the participant of interest. In one example, participant parameters in the request may include one or more of: an email address, a first name, a last name, a physical address, nicknames, and/or physical characteristics (e.g. age, height, hair color, etc.) of the participant of interest. In aspects, the Web UI 112 of the access management server 102 receives the personal data request from a third party (e.g., Nodes 1-3), wherein the personal data request includes identifying information enabling the access management server 102 to identify the third party from whom the request is received. In implementations, a Representational State Transfer (REST) Application Program Interface (API) is utilized to communicate information between the Nodes 1-3 and the access management server 102. In aspects, the REST API is utilized to enter data into the access management server 102, update data in the personal data management environment 100, delete data in third party user databases 108-110, and update data in the third party user databases 108-110.

In embodiments, the access management server 102 receives multiple requests from different third parties (e.g., Nodes 1-3 of FIG. 4) at step 501, and may handle the requests simultaneously. In the example shown in FIG. 4, Node 1 sends a request including personal parameters for "Joe Doe", Node 2 sends a request including personal parameters for "John A. Doe", and Node 3 sends a request containing personal parameters for "John Doe".

At step 502, the access management server 102 generates a record of personal data for the participant of interest based on one or more personal data requests received at step 501. In implementations, the MDM module 113 of the access management server 102 performs step 502. In embodiments, the record contains personal parameters (e.g., information associated with the participant of interest) based on the requests received at step 501 and/or personal parameters derived from the master database 115 of the access management server 102. In one example, the record includes personal parameters for "Joe Doe" from Node 1, "John A. Doe" from Node 2, and "John Doe" from Node 3.

Optionally, at step 503, the access management server 102 sends a request for personal data for the participant of interest to the blockchain system 111 based on the record generated at step 502 and the one or more third party requests of step 501. In aspects, the request for personal data includes personal parameters associated with the participant of interest, which enable the Nodes 1-3 of the blockchain system 111 to search for and obtain from their respective user databases (e.g., user databases 018-110) any personal data they have associated with the participant of interest. In embodiments, the MDM module 113 of the access management server 102 performs step 503.

At step 504, the access management server 102 receives one or more responses from the blockchain system 111 in response to the request for personal data of step 503. Responses may be received from one or more third party nodes (e.g., Nodes 1-3) of the blockchain system 111. In aspects, the responses include personal data derived from the user databases 108-110 of the individual third party Nodes 1-3 based on personal parameters included in the request for personal data. In one example, the access management server 102 obtains personal data associated with "Joe Doe" from Node 1, obtains personal data associated with "John A. Doe" from Node 2, and obtains personal data associated with "John Doe" from Node 3, in response to the request of step 503. The request of step 503 and the response of step 504 may be communicated utilizing the Web UI 112 of the access management server 102 and the network 106. In embodiments, the MDM module 113 of the access management server 102 performs step 504.

At step 505, the access management server 102 generates a request for verification/permission for the participant of interest based on information obtained from the request for personal data of step 503, and sends the request to the participant of interest. For example, the access management server 103 communicates the request for verification/permission utilizing the Web UI 112 to a user computer device 104 of the participant of interest. In aspects, the request for verification/permission includes personal data obtained from the blockchain system 111 in response to the request for personal data of step 503. In implementations, the request for verification/permission includes personal data obtained from the personal data request of step 501 and/or personal data the access management server 102 obtains from its master database 115. In implementations, the MDM module 113 of the access management server 102 performs step 505. In one example, the access management server 102 obtains personal data associated with "Joe Doe" from Node 1, obtains personal data associated with "John A. Doe" from Node 2, and obtains personal data associated with "John Doe" from Node 3 at step 504, and sends this data to the user computer device 104 of the participant of interest, along with options to authenticate the information, remove personal data from one or more third party sites, update the personal data, and/or authorize third party access to the personal data in accordance with step 505.

At step 506, the access management server 102 receives a response to the request for verification/permission from the participant of interest. In implementations, the MDM module 113 of the access management server 102 performs step 506. In aspects, the response includes one or more of: verification or authentication of personal data included in the request for verification/permission; updates to the personal information; a request to remove personal data from one or more third party sites; and permissions to allow one or more third parties (e.g., Nodes 1-30) access to the personal data set forth in the request for verification/permission and/or personal data set forth in the response to the request of step 505. In one example, the access management server 102 receives a response to the request for verification/permission from the participant indicating that the personal data associated with "John A. Doe" from Node 2 and the personal data associated with "John Doe" from Node 3 is correct, but the personal data associated with "Joe Doe" from Node 1 is not correct (e.g., the personal data associated with Joe Doe is not the participant of interest's data). In this example, the participant of interest also accepts the request for information from third party Node 2 and Node 3, but not from Node 1, thereby authorizing the access management server 102 to enable sharing of the participant's personal data with Node 2 and Node 3.

At step 507, the access management server 102 updates personal data of the personal data management environment 100 as necessary. In embodiments, the access management server 102 updates personal data based on the response to the request for verification/permission received at step 506. In implementations, the access management server 102 updates personal data based on the one or more responses to the request for personal data from the blockchain system 111. In implementations, the access management server 102 updates personal data at one or third party nodes (e.g., Nodes 1-3) by replacing incorrect or outdated personal data with current or verified personal data (e.g., personal data authenticated or verified by the participant of interest at step 506). In embodiments, the access management server 102 initiates the deletion of personal data at one or more of the third party nodes (e.g., Nodes 1-3). In implementations, the MDM module 113 of the access management server 102 performs step 507.

At step 508, the access management server 102 updates rules associated with the management of personal data. In aspects, the access management server 102 updates permissions in user registration profiles for the participant of interest. For example, the access management server 102 may update a user profile of a participant of interest to grant or deny permission to personal data of the participant based on the response to the request for verification/permission received at step 507. In implementations, the MDM module 113 of the access management server 102 performs step 508.

In embodiments, the access management server 102 is configured to receive requests for information regarding a participant's personal data from either a third party (e.g., Nodes 1-3) or from the participant themselves (e.g., via user computer device 104). In this way, the access management server 102 manages the flow of data for third parties and participants (e.g., potential consumers of third party services or products).

At step 509, the access management server 102 receives a personal data request from a participant. In implementations, the access management server 102 receives the personal data request from a user computer device 104 of the participant via the WEB UI 112. In aspects, the request identifies one or more third parties from whom the participant wishes to receive information regarding their personal data. For example, a participant wishing to determine what personal data of theirs is housed in the user database 108 of Node 1 can submit a personal data request regarding Node 1 to the access management server 102, wherein the participant identifies Node 1 using an email or web address associated with Node 1. Alternatively, the participant can send a general personal data request to the access management server 102 in order to determine what personal information of the participant is stored in the blockchain system 111. In implementations, the personal data request includes personal parameters associated with the participant, such as the participants first name, last name, middle initial, date of birth, etc. Since the personal parameters originate from the participant, no verification of this personal data is required.

At step 510, the access management server 102 generates a record of personal data for the participant based the personal data request received at step 509. In implementations, the MDM module 113 of the access management server 102 performs step 502. In embodiments, the record contains personal parameters based on the personal data request received at step 509. In aspects, the record contains personal parameters derived from the master database 115 of the access management server 102.

Steps 511 and 512 may then be performed in accordance with steps 503, 504 and 509. That is, in embodiments, the access management server 102: sends a request for personal data to the blockchain system 111 based on the record of step 510 and the personal data request of step 509 in accordance with step 503; receives one more responses to the request for personal data from the blockchain system 111 in accordance with step 504; and updates personal data of the participant and personal data management rules based on the request for personal data and the response from the blockchain system in accordance with steps 507 and 508.

It should be understood that the steps of FIG. 5 need not be performed in the order shown unless otherwise noted herein. For example, a request for personal data of a participant may be sent to the blockchain system in accordance with step 503 after authentication of certain personal data of the participant in accordance with step 505. In an exemplary scenario, a primary third party (Node 1) sends a search request to the access management server 102 (either directly via the WEB UI 112 or via a REST API call) in accordance with step 501, wherein the first third party is searching for personal data of a participant of interest. Likewise, the access management server 102 receives a search request from a secondary third party (Node 2) and a tertiary third party (Node 3) in accordance with step 501. The MDM module 113 of the access management server 102 generates a record of personal data associated with the participant of interest, using participant parameters from the search requests in accordance with step 502. In this example, the participant parameters obtained from the search requests include the first and last name "Joe Doe" from Node 1, the first, middle and last name John A. Doe" from Node 2, and the first and last name "John Doe" from Node 3. The MDM module 113 searches its master database 115 of personal data to generate a record based on the participant parameters from the search request. In this example, the MDM module 113 determines with a 95% confidence level a match between the participant parameters and a set of personal data in the master database 115 of the MDM module 113 and generates a record of personal data based thereon.

In accordance with the exemplary scenario, the MDM module 113 sends the record of personal data to the participant for verification, and to determine if Nodes 1-3 should be granted access to the participant's personal data in accordance with step 505. In this scenario, the participant authenticates the information from Nodes 2 and 3 but indicates that he is not "Joe Doe". Accordingly, the user accepts the request for information from Node 2 and Node 3, but not Node 1, in accordance with step 506. The MDM module 113 then revises the record of the participant (e.g., in master database 115) to produce a record of authenticated personal data associated with the participant, according to step 507.

In continuance of the exemplary scenario, the MDM module 113 sends a search request to the blockchain system 111 requesting personal data associated with the participant, including personal parameters derived from the authenticated record, in accordance with step 504. The purpose of such a search is to determine outdated and duplicative personal data at various nodes (e.g., Nodes 1-3) of the blockchain system 111. The MDM module 113 receives results from the blockchain system 111 showing duplicates and alternative versions of participant parameters associated with the participant of interest. The MDM module 113 then initiates updates of the participant parameters based on the search results, where necessary, according to step 507. In this example, the MDM module 113 initiates updating of personal data at the first third party (Node 1) to include updated personal data of the participant (e.g., an updated physical address of the participant). Additionally, the MDM module 113 updates Node 1 to indicate that the personal parameters associated with "Joe Doe" relate to a different participant than the participant of interest.

Figure 6:
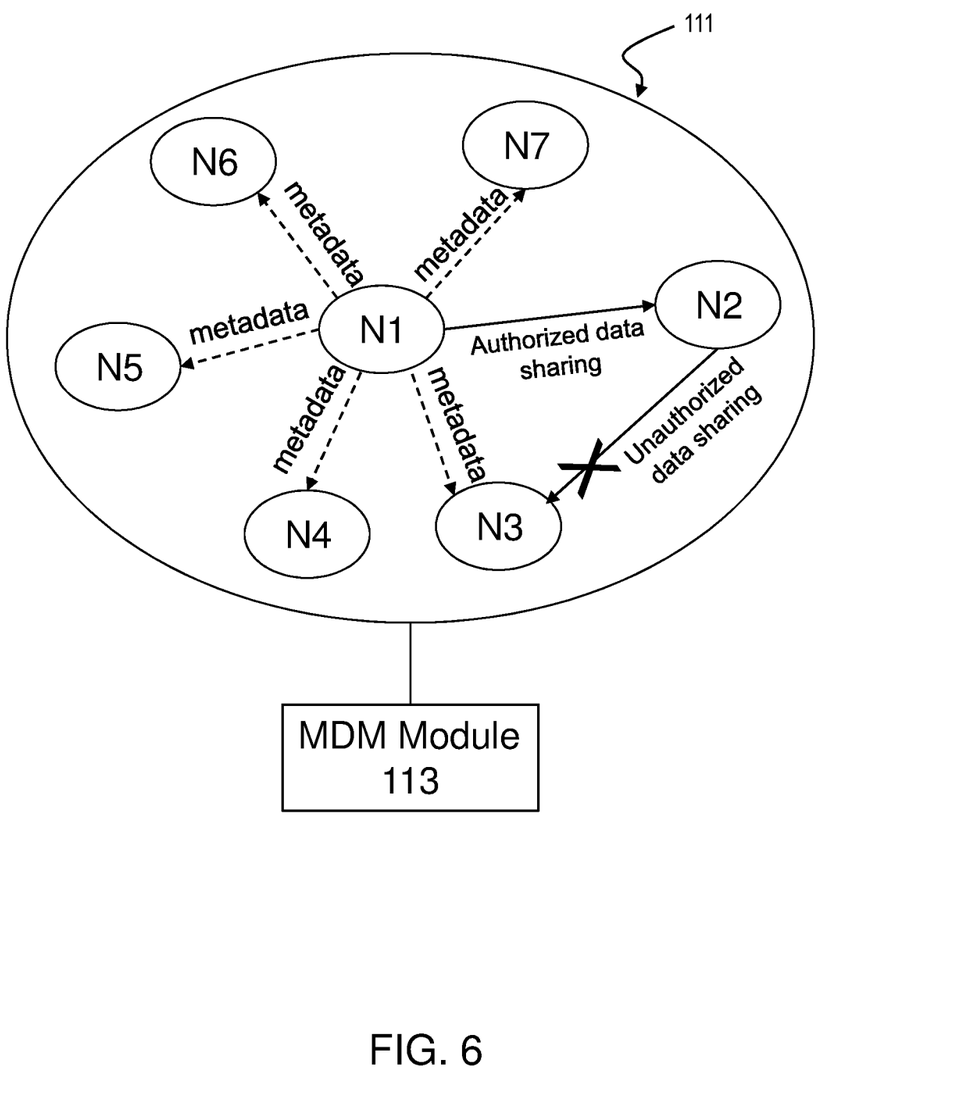
FIG. 6 is a diagram showing data sharing transactions within the blockchain system 111 according to embodiments of the invention.

FIG. 6 is a diagram showing data sharing transactions within the blockchain system 111 according to embodiments of the invention. In one embodiment, the access management server 102 (e.g., via the MDM module 113) initiates a data sharing transaction by sending instructions to one or more nodes N1-N7 of the blockchain system 111 to share personal data of the participant. Such data sharing transactions may be part of the personal data updating process of step 507. In one example, the Node 1 shares physical address data of the participant with the Node 2 in accordance with predetermined permissions of the participant (e.g., permissions received in accordance with step 506). In addition, the MDM module 113 causes metadata of the data sharing transaction to be transmitted to the remaining Nodes 3-7 in the blockchain system 111. Accordingly, Nodes 3-7 are aware of the sharing of data by Nodes 1 and 2. Since Nodes 3-7 receive metadata of the data sharing transaction, they do not know the actual value of the data, but do know what parameters in the data were shared by Node 1 with Node 2. In the future, if Node 2 tries to share the same data with another node (e.g., Node 3), the sharing of the data will not be allowed since Node 3 already contains meta data of the original sharing transaction data and knows that Node 1 has shared the data with Node 2 with the condition that the data is not to be shared with any other party in the future. Thus, the sharing of the data of Node 2 will be rejected by Node 3.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In embodiments, the invention provides a computer-implemented method including: receiving from a user a search request comprising search parameters for a search for a record of personal data; communicating the search to a MDM system and a blockchain system; upon the MDM system returning MDM information comprising the record of personal data and potential duplicates of the personal data: sending to the blockchain system a request comprising the search parameters and the received MDM information; receiving from the blockchain system search results regarding duplicates of the personal data; and performing an update on the personal data based on the search results, where the search results warrant such an update.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computer device, a search request regarding data of a participant, the search request including participant parameters associated with the participant;
generating, by the computer device, a record of data associated with the participant based on the search request;
sending, by the computer device, a request for data to third party nodes of a blockchain system based on the search request and the record;
receiving, by the computer device, results from the blockchain system, the results including at least one set of data from a first node of the third party nodes; and
determining, by the computer device, that the set of data requires updating based on the results.

2. The computer-implemented method of claim 1, wherein the participant parameters are selected from at least one of the group consisting of: an email address of the participant; a first name of the participant; a last name of the participant; a physical address of the participant; a nickname of the participant; and one or more physical characteristics of the participant.

3. The computer-implemented method of claim 1, further comprising implementing, by the computer device, an update of the set of data by the blockchain system, wherein the computer device causes a second node of the third party nodes to send updated data to the first node.

4. The computer-implemented method of claim 3, further comprising sending, by the computer device, a request for permission to share data of the participant with the first node, wherein the implementing the update is contingent on receiving permission from the participant.

5. The computer-implemented method of claim 3, further comprising implementing, by the computer device, dispersal of metadata regarding the update to other nodes of the third party nodes, wherein the metadata indicates the updated data was shared between the second node and the first node.

6. The computer-implemented method of claim 1, further comprising implementing, by the computer device, an update of the set of data by the blockchain system, wherein the computer devices causes data to be removed from the first node.

7. A computer program product, the computer program product comprising a computer readable storage medium having program instructions embodied therewith, the program instructions executable by a computer device to cause the computer device to:
receive a search request from a third party regarding data of a participant, the search request including participant parameters associated with the participant;
generate a record of data associated with the participant based on the search request;
send a request for data to third party nodes of a blockchain system based on the search request and the record;
receive results from the blockchain system, the results including sets of data from the third party nodes of the blockchain system;
generate and send a request for verification to the participant, wherein the request for verification includes information based on the record and the sets of data;
receive a response to the request for verification, the response indicating acceptance or rejection of the information; and
initiate updating of the sets of data as needed based on the response to the request for verification.

8. The computer program product of claim 7, wherein the information is selected from at least one of the group consisting of: an email address of the participant; a first name of the participant; a last name of the participant; a physical address of the participant; a nickname of the participant; and one or more physical characteristics of the participant.

9. The computer program product of claim 7, wherein the updating of the sets of data comprises initiating a first node of the third party nodes to send updated data to a second node of the third party nodes.

10. The computer program product of claim 9, wherein the program instructions further cause the computer device to implement dispersal of metadata regarding the updating of the sets of data to other nodes of the third party nodes, wherein the metadata indicates the updated data was shared between the first node and the second node.

11. The computer program product of claim 9, wherein the program instructions further cause the computer device to send a request for permission to share data of the participant with the second node, wherein the updating the of the sets of data is contingent on receiving permission from the participant.

12. The computer program product of claim 7, wherein the program instructions further cause the computer device to implement removal of data from one or more of the third party nodes based on the response to the request for verification.

13. A system comprising:
a processor, a computer readable memory, and a computer readable storage medium;
program instructions to receive a search request regarding data of a participant, the search request including participant parameters associated with the participant and identification of a third party;
program instructions to generate a record of data associated with the participant based on the search request;
program instructions to send a request for data to the nodes of a blockchain system based on the search request and the record;
program instructions to receive results from the blockchain system, the results including at least one set of data; and
program instructions to determine that the set of data requires updating based on the results,
wherein the program instructions are stored on the computer readable storage medium for execution by the processor via the computer readable memory.

14. The system of claim 13, wherein the participant parameters are selected from at least one of the group consisting of: an email address of the participant; a first name of the participant; a last name of the participant; a physical address of the participant; a nickname of the participant; and one or more physical characteristics of the participant.

15. The system of claim 13, wherein the third party and at least one other third party are participants in the blockchain system.

16. The system of claim 15, further comprising program instructions to implement an update of the set of data by the blockchain system, wherein the computer device causes the at least one other third party to send updated data to the third party.

17. The system of claim 16, further comprising program instructions to send a request for permission to share data of the participant with the third party, wherein the implementing the update is contingent on receiving permission from the participant.

18. The system, of claim 16, further comprising program instructions to implement dispersal of metadata regarding the update to the blockchain system, wherein the metadata indicates the updated data was shared between the at least one other third party and the third party.

19. The system of claim 13, further comprising program instructions to implement an update of the set of data by the blockchain system, wherein the system causes data to be removed from a database of the third party.

20. The system of claim 13, further comprising program instructions to update information regarding the participant in a master database of the system based on the participant parameters associated with the participant.

* * * * *